(12) United States Patent
Sato (10) Patent No.: US 11,562,190 B2
(45) Date of Patent: Jan. 24, 2023

(54) IMAGE PROCESSING APPARATUS, CONTROL METHOD, AND NON-TRANSITORY COMPUTER-READABLE STORAGE MEDIUM WITH AUTOMATIC SETTING OF MARGIN SIZE

(71) Applicant: CANON KABUSHIKI KAISHA, Tokyo (JP)

(72) Inventor: Taiki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/094,872

(22) Filed: Nov. 11, 2020

(65) Prior Publication Data

US 2021/0158111 A1 May 27, 2021

(30) Foreign Application Priority Data

Nov. 21, 2019 (JP) ............... JP2019-210623

(51) Int. Cl.
*G06K 15/02* (2006.01)

(52) U.S. Cl.
CPC ..... *G06K 15/1885* (2013.01); *G06K 15/1807* (2013.01); *G06K 15/1809* (2013.01); *G06K 15/1822* (2013.01); *G06K 15/1889* (2013.01)

(58) Field of Classification Search
CPC .......... G06K 15/1885; G06K 15/1822; G06K 15/1809; G06K 15/1807; G06K 15/1889
See application file for complete search history.

(56) References Cited

U.S. PATENT DOCUMENTS

| | | | |
|---|---|---|---|
| 6,587,596 B1* | 7/2003 | Haeberli | H04N 1/3871 382/283 |
| 2004/0150856 A1* | 8/2004 | Asai | G06K 15/1889 358/1.18 |
| 2007/0146737 A1* | 6/2007 | Morimoto | H04N 1/3873 358/1.2 |
| 2007/0153310 A1* | 7/2007 | Jung | H04N 1/3873 358/1.12 |
| 2008/0291497 A1* | 11/2008 | Kuwano | G06F 3/1208 358/1.18 |
| 2015/0166293 A1 | 6/2015 | Hamamura et al. | |
| 2019/0089847 A1* | 3/2019 | Tokuchi | H04N 1/38 |
| 2019/0111714 A1* | 4/2019 | Kan | H04N 1/00466 |
| 2019/0191037 A1* | 6/2019 | Tsukahara | H04N 1/00779 |

FOREIGN PATENT DOCUMENTS

JP 2015-117983 A 6/2015

* cited by examiner

*Primary Examiner* — Juan M Guillermety
(74) *Attorney, Agent, or Firm* — Venable LLP (57) ABSTRACT

An image processing apparatus extracts a margin portion from an input image in a case in which the input image is a margined formation target image formed so as to include a margin, and automatically executes, based on the extracted margin portion, a print setting of the input image.

18 Claims, 9 Drawing Sheets

FILE  EDIT  HELP

PRINTER | Canon P-4000 ▽
SHEET TYPE | PLAIN PAPER ▽
SHEET SIZE | A0 WIDTH X HEIGHT ▽

LENGTH OF MARGIN
TOP | xxx ▽      BOTTOM | xxx ▽
LEFT | xxx ▽     RIGHT | xxx ▽

☐ ADD TRIM MARK
☑ ADD CAPTURING DATE

PRINT 202
802
801 IMAGE
803
804 IMAGE
805

THUMBNAIL IMAGE

FIG. 10

IMAGE PROCESSING APPARATUS, CONTROL METHOD, AND NON-TRANSITORY COMPUTER-READABLE STORAGE MEDIUM WITH AUTOMATIC SETTING OF MARGIN SIZE

BACKGROUND OF THE INVENTION

Field of the Invention

The present invention relates to an image print setting technique.

Description of the Related Art

A printing system that cuts a printed medium and outputs a final product is known. Japanese Patent Laid-Open No. 2015-117983 discloses, with respect to such a printing system, a method that can specify a cutting position of a medium without setting an unnecessary blank on the medium.

The technique disclosed in Japanese Patent Laid-Open No. 2015-117983 is a technique for eliminating a blank when cutting is to be performed, and does not consider a case in which an image formed to include an intentionally arranged blank portion (margin portion) is to be printed.

SUMMARY OF THE INVENTION

The present invention provides a method for improving the convenience of printing an image which is formed to include a margin portion.

According to one aspect of the present invention, there is provided an image processing apparatus comprising: one or more processors; and one or more memories that store a computer-readable instruction for causing, when executed by the one or more processors, the one or more processors to function as an extraction unit configured to extract a margin portion from an input image in a case in which the input image is a margined formation target image formed so as to include a margin, and an execution unit configured to automatically execute, based on the extracted margin portion, a print setting of the input image.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

This embodiment will describe an image processing apparatus that executes display and print control of formation target image data formed for printing. The image processing apparatus executes, based on a user operation, display processing and print processing by setting, as formation target image data, an image formed by combining texts, graphics, and a photograph and an image formed by cutting out a print target portion from this former image. In this case, print data based on the formation target image data is printed on a print medium by a printer such as an inkjet printer, a full-color laser beam printer, a monochrome printer, or the like. A print medium can be, for example, a rolled sheet or a cut sheet. However, the print medium is not limited to a paper medium and may also be another medium such as a cloth, a film, or the like. Note that after the formation target image has been printed, the print medium is cut in accordance with, for example, the size of the margin and is output as a final product. In this case, an image is printed up to each edge of the medium of the final product: a product without each margin formed by a blank or a single color area will be referred to as a "marginless" product; and a product in which such a margin is arranged on each edge of the medium of the product will be referred to as a "margined" product. The margined/marginless setting can be made at the stage of the formation target image data which is to be the target of display processing and print processing. A formation target image may be referred to as a "margined formation target image"/"marginless formation target image" depending on the margined/marginless setting. That is, a formation target image which includes a margin in an image corresponding to a product to be obtained will be referred to as a margined formation target image, and a formation target image which does not include a margin in an image corresponding to a product to be obtained will be referred to as a marginless formation target image.

For example, in a case in which margined formation target image data is input to an application, assume that a user uses the application to make a setting to add information such as a character string indicating a capturing date in the margin portion. Also, for example, assume that the margined formation target image data has been input to an application and the user has made a setting to add trim marks by using the application. In these cases, another margin may be formed outside the margined formation target image data, and the information of a character string or the like may be added to this other outside margin. If these above-described cases are generated, a product which is not in accordance with the intention of the user may be output. Hence, in this embodiment, in a case in which margined formation target image data is set as a print target, the image processing apparatus will automatically specify the margin portion of the margined formation target image data. This embodiment will also automatically execute the print setting so that the margined formation target image data including this margin portion will be printed according to the intended shape (for example, the actual size).

Examples of the arrangement and the procedures of an image processing apparatus that executes such processing will be described hereinafter.

Arrangement of Apparatus

Figure 1:
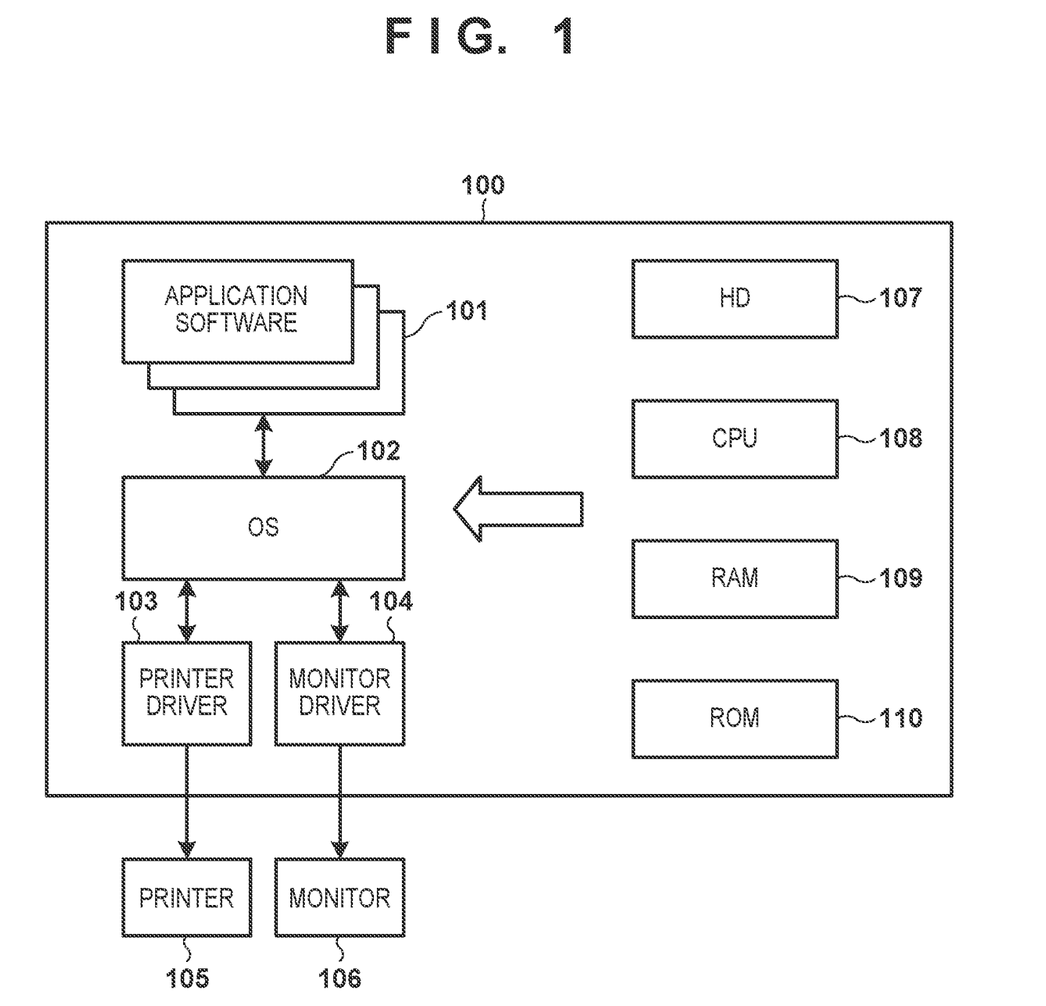
FIG. 1 is a block diagram showing an example of the arrangement of an image processing apparatus.

FIG. 1 shows an example of the arrangement of an image processing apparatus according to this embodiment. Note that the image processing apparatus will be implemented by a computer and will be referred to as a host computer 100 hereinafter. Although this embodiment shows an example in which a printer 105 and a monitor 106 are connected to the host computer 100, the present invention is not limited to this. For example, the host computer 100 may incorporate at least one of the printer 105 and the monitor 106. Also, the components of the host computer 100 to be described below may be included in another apparatus. Note that the steps of each flowchart of this embodiment to be described below are implemented by a CPU 108 executing a corresponding program (for example, a print application 101 (to be described below)) related to the flowchart.

The host computer 100 is, for example, a general-purpose computer and includes an HD 107, the CPU 108, a RAM 109, a ROM 110, and the like. Note that HD, CPU, RAM, and ROM are abbreviations of hard disk, central processing unit, random access memory, and read only memory, respectively. The host computer 100 executes each of the various kinds of processing including the processing operations to be described below by causing the CPU 108 to execute a corresponding program which has been read out from, for example, the HD 107 or the ROM 110. Note that the image processing apparatus may be implemented by dedicated hardware and need not always have an arrangement as shown in FIG. 1.

The host computer 100 is configured to be able to execute, for example, the pieces of application software 101 such as a word processor, a spreadsheet, an internet browser, and the like. Note that the host computer 100 can execute these pieces of application software 101 under the control of an OS 102. The OS 102 is software which is activated when a CPU 108 executes a program stored in the ROM 110 at the activation of the host computer 100. OS is an abbreviation of operating system.

Various kinds of draw processing commands (an image draw command, a text draw command, and a graphic draw command) that indicate an output image to be issued by the application software 101 are output to a monitor driver 104 via the OS 102. In addition, when printing is to be performed, these draw processing commands can be output to a printer driver 103 via the OS 102. The printer driver 103 is software that creates print data by processing the draw processing commands and causes the printer 105 to execute printing based on this print data. Also, the monitor driver 104 is software that processes the draw processing commands to display an image on the monitor 106. The application software 101 according to this embodiment creates output image data by using text data which is classified as a text made from characters or the like, graphic data which is classified as a graphic such as a pattern or the like, and image data classified as a photograph or the like. The created output image data is output to the monitor 106 via the monitor driver 104, and the output image data is displayed on the monitor 106. Also, in a case in which image printing is to be executed based on the output image data, the application software 101 will issue a print output request to the OS 102. As a result, draw processing commands in which a text data portion is formed by a text draw command, a graphic data portion is formed by a graphic draw command, and an image data portion which is formed by an image draw command are output to the printer driver 103.

Note that although the host computer 100 can execute the pieces of application software 101 corresponding to various kinds of processing operations other than image display and printing, this embodiment will provide a description particularly focused on image display and printing.

Example of Screen Arrangement

Figure 2:
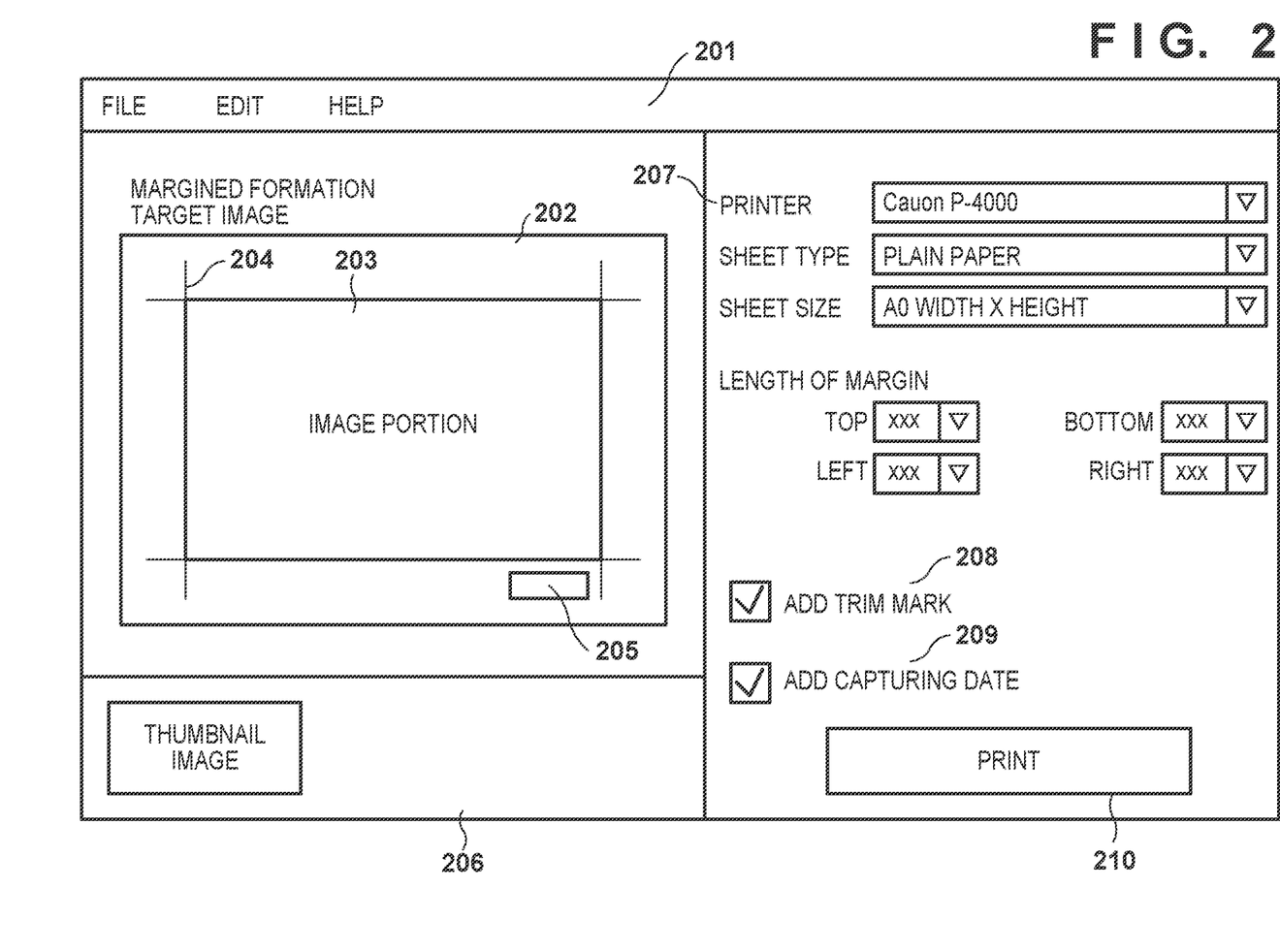
FIG. 2 is a view showing an example of the arrangement of a screen for accepting a user operation.

FIG. 2 shows an example of a screen which is displayed when margined formation target image data is input to the application software 101. Note that the application software 101 which is to perform the processing related to this embodiment will be referred to as a print application hereinafter.

A user uses the screen of FIG. 2 to make an operation to add pieces of image information such as trim marks and a capturing date on the margin portion of the margined formation target image data. This screen includes an operation portion 201, a page display area 202, a thumbnail image display area 206, a print setting menu 207, and a print button 210. The operation portion 201 is an area for accepting an operation to end the print application 101, an operation to designate an image on a page, an operation for editing, and the like.

The user can select, for example, a "file" and designate the formation target image data which is to be set as a print target from a submenu included in this file. Note that the formation target image data to be fetched by the print application 101 is generated by another application 101 which is separate from the print application 101. As a result of the designation, the designated formation target image data is displayed on the page display area 202. If the margined formation target image data is selected at this time, an image excluding the margin of the margined formation target image data is displayed on an image portion 203 which is smaller than the page display area 202. On the other hand, an area other than the image of the margined formation target image is handled as a margined portion. The thumbnail image display area 206 is an area for displaying a thumbnail of the contents displayed in, for example, the page display area 202. Note that FIG. 2 shows an example in which one thumbnail image is displayed. However, in a case in which processing of a plurality of images is executed on this screen, the thumbnails of the plurality of images can be arrayed and displayed on the thumbnail image display area 206. The print setting menu 207 is an area for accepting settings about the printer, the sheet type, and the sheet size. Also, the print setting menu 207 can include an area for accepting settings about the lengths of the top, bottom, left, and right margins of a margined image. Furthermore, the print setting menu 207 includes a setting area 208 for accepting a setting as to whether trim marks are to be added and a setting area 209 for accepting a setting as to whether capturing date information is to be added. The print button 210 is a button that causes the image displayed on the page display area 202 to be printed when this button is pressed by the user. That is, when the print button 210 is pressed, the draw processing commands are output from the print application 101 and are converted into print data by the printer driver 103. Subsequently, the print data is transmitted to the printer 105.

The page display area 202 displays, for example, the image data input to the print application 101. That is, for example, an image corresponding to a formation target image such as a margined formation target image which is planned to be obtained as a printed product is displayed in the page display area 202. The user can grasp the image of the printed product by observing the image displayed in the page display area 202. At this time, the print application 101 extracts the information of the margin portion from the margined formation target image data as an input image, and this information is reflected on settings of the sheet size and the lengths of the margins of the print setting menu 207. As a result, the page display area 202 displays an image which has a layout corresponding to that of the margined formation target image data as the input image. Note that the page display area 202 displays the results of the changes to the settings related to the printer, the sheet type, the sheet size, and the like accepted via the print setting menu 207, and user operations for editing the image data can be accepted via the page display area 202. However, in a case in which the margined formation target image data is used as an input image, the setting change operation via the print setting menu 207 may be disabled. That is, the host computer 100 may be set to a state which does not accept a setting operation so that a product corresponding to the margined formation target image data can be obtained.

In a case in which the addition of trim marks is selected via the setting area 208, trim marks 204 are added on a portion (margin portion) outside the image portion 203 of the margined formation target image data in the page display area 202. In a similar manner, in a case in which the addition of a capturing date is selected via the setting area 209, a capturing date 205 is added to a portion (margin portion) outside the image portion 203 of the margined formation target image data in the page display area 202. Note that the trim marks and the capturing date are added to the margin portion of the margined formation target image data. FIG. 2 shows an example in which the settings to add the trim marks and the capturing date have been made on the setting area 208 and the setting area 209, respectively, and the trim marks 204 and the capturing date 205 have been added to the margin portion of the image portion 203.

Figure 3:
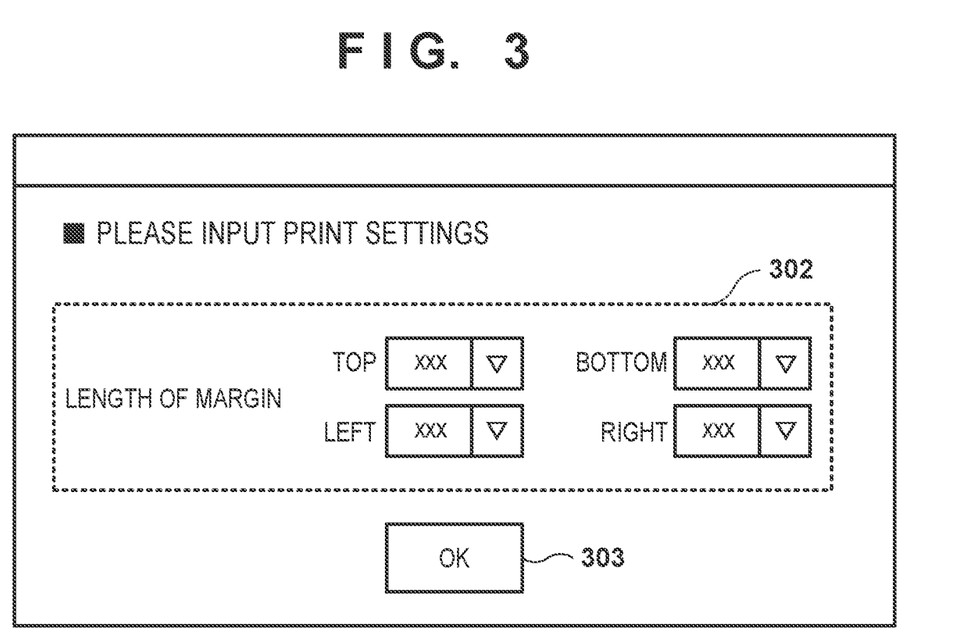
FIG. 3 is a view showing an example of a screen for inputting a print setting of a marginless formation target image.

FIG. 3 shows an example of a window which is displayed to accept print settings when marginless formation target image data is input in the print application 101. That is, the window shown in FIG. 3 is displayed when it is determined that the input image data is not the margined formation target image data. A window 301 includes an item 302 for setting the print settings, a button 303 for reflecting the set values and displaying the image in the page display area 202, a cancel button to cancel the settings, and the like. Note that the user can, for example, cause an image to be displayed in a margined format in the page display area 202 by setting a value greater than zero as the value of each margin length in the item 302. A screen as shown in FIG. 2 can be displayed after the settings are completed on the screen of FIG. 3.

Note that if the print settings have been set to the margined format when the print button 210 is pressed (that is, if a value greater than zero is set as the value of each margin length), the medium can be cut while allowing each margin area to remain. That is, since the print application 101 will add a trim mark on the outer side of each margin intended by the user, the user will be able to execute an appropriate cutting process on the printed product. As a result, the cut product will be a product as intended by the user.

Procedure of Processing

Figure 4:
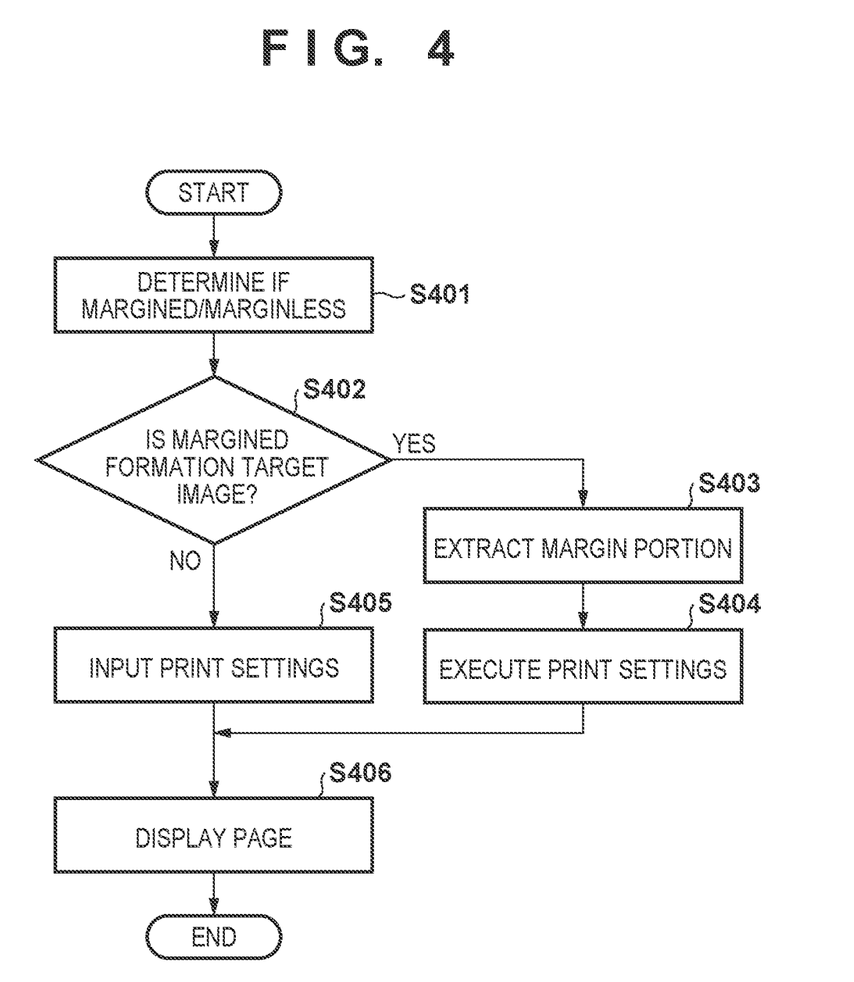
FIG. 4 is a flowchart showing an example of the procedure of image display processing.

FIG. 4 shows an example of the procedure of processing for displaying an input image in the page display area 202. This processing is started in response to the print application 101 fetching the input image data. First, in this processing, the print application 101 discriminates whether the input image data is a margined formation target image or a marginless formation target image (step S401). If it is determined that the input image data is the margined formation target image (YES in step S402), the print application 101 performs processing to extract the margin portion (step S403). Next, the print application 101 executes print settings by using the information of the margin portion to display an image corresponding to the layout of the input image data in the page display area 202 (step S404). The processing for discriminating whether the input image data is the margined formation target image data, the processing for extracting the margin portion of the margined formation target image data, and the processing for executing the print settings will be described here with reference to FIGS. 5A and 5B. Note that FIGS. 5A and 5B will describe a case in which the input image data is the margined formation target image data. Note that the processing operations to be described hereinafter are merely examples, and another method different from that to be described below may also be adopted.

Figure 5A:
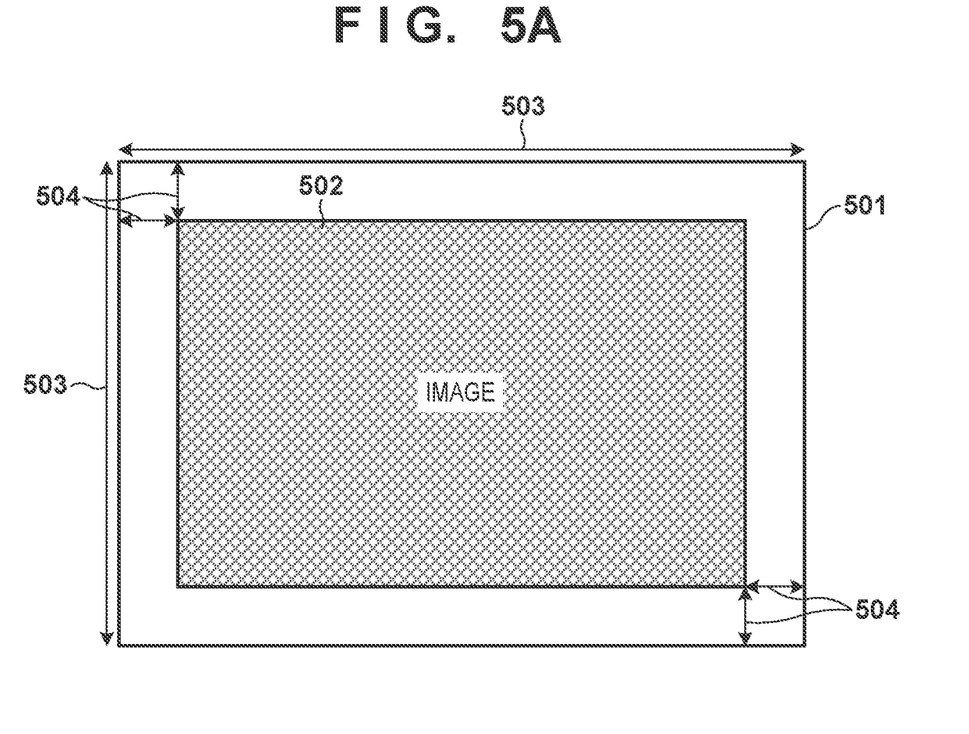
FIGS. 5A and 5B are views for explaining processing to discriminate whether an image is a margined formation target image, processing to extract a margin portion of the margined formation target image, and processing to change the print setting.
Figure 5B:
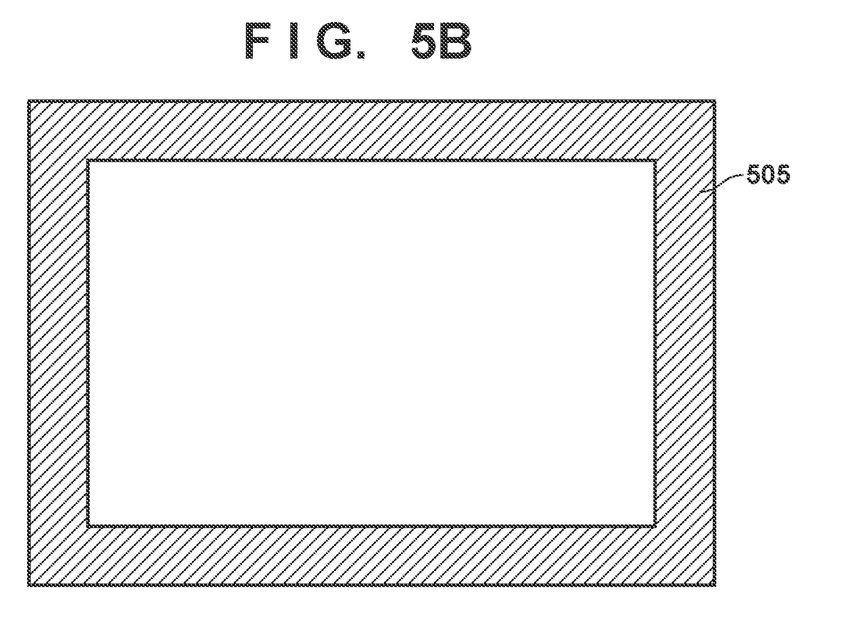

When input image data 501 is input, the print application 101 determines whether a width 504 is constant in a given side of the input image data 501 because the same pixel values are continuously present from the outer side to the inner side of the input image data. If the same pixel values are continuously present in the constant width 504 from the outer side to the inner side of the given width of the input image data 501, the print application 101 will specify this area corresponding to the portion of the width 504 from this given side as the margin portion. Also, in this case, the print application 101 will determine that the input image data is the margined formation target image data. Furthermore, the print application 101 will extract the area of the width 504 from the above-described side as a margin portion 505 of the margined formation target image data. In addition, the print application 101 will set a size 503 of the margined formation target image data to the sheet size of the print setting menu 207 and set the width 504 of the margin portion of the margined formation target image data as the length of each margin of the print setting menu 207.

If it is determined that the input image is not the margined formation target image data, the print application 101 does not execute the processes of steps S403 and S404 and accepts user input to the print settings (step S405). That is, if NO is determined in step S402, a screen as shown in FIG. 3 is displayed to accept user input. For example, when the user designates the size of the margin, the size of the print target area is changed without changing the size of the marginless formation target image data, and the sheet size is set in accordance with this changed setting. That is, the sheet size is set based on the size of the marginless formation target image data and the input size of the margin.

Subsequently, the print application 101 displays the image reflecting the set print settings in the page display area 202 (step S406) and ends the processing of FIG. 4. In this manner, in a case in which the input image data is the margined formation target image data, the margin portion is automatically detected and the print settings are automatically made based on this margin portion. As a result, a printed product which is in accordance with the prepared margined formation target image data and in a shape (for example, having the size and the margin width) intended by the user can be obtained.

Figure 6:
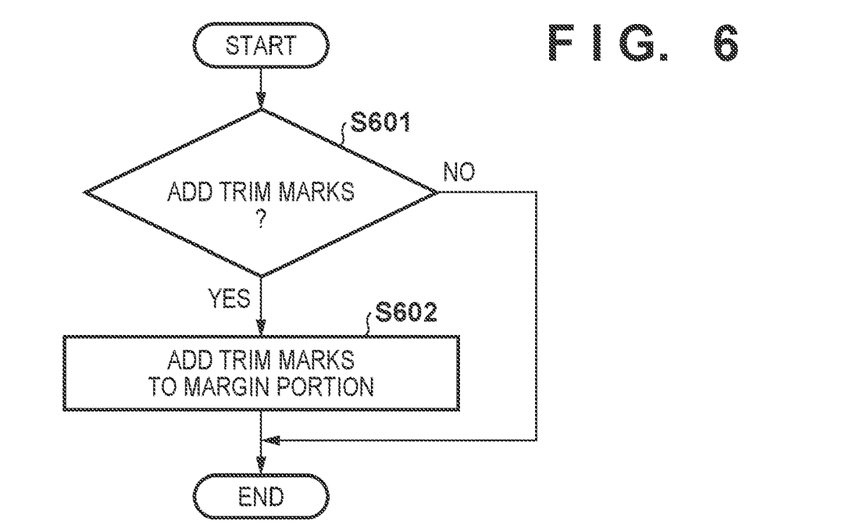
FIG. 6 is a flowchart showing a first example of the procedure of processing to add trim marks on the margined formation target image.
Figure 7:
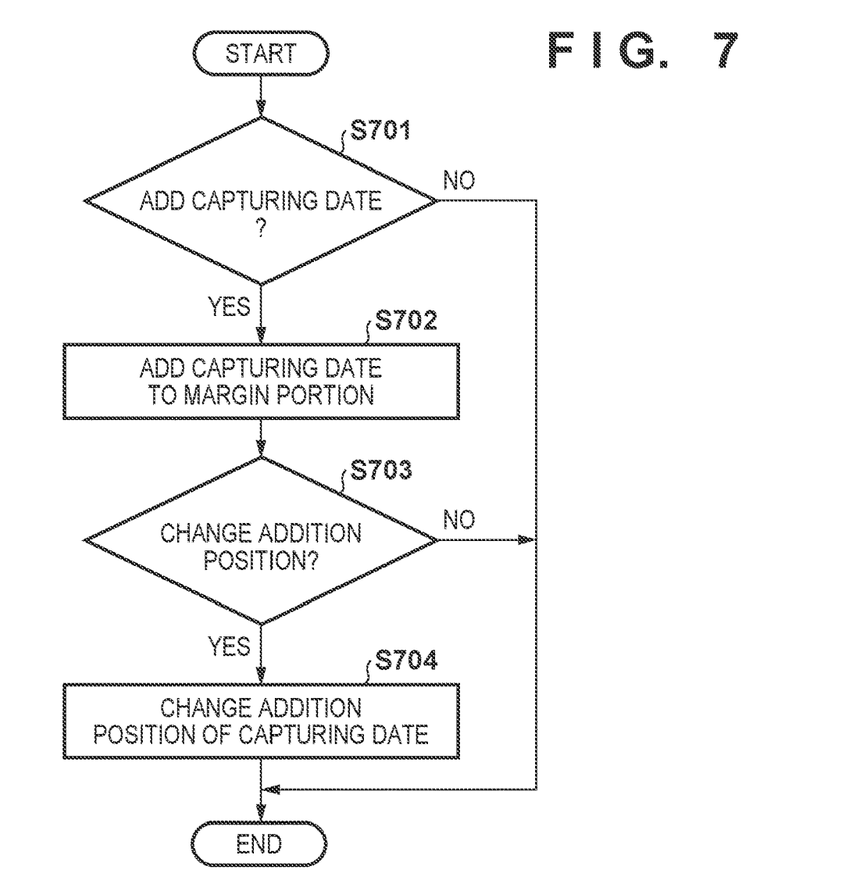
FIG. 7 is a flowchart showing a first example of the procedure of processing to add a capturing date on the margined formation target image.

In recent years, a professional print application for professional photographers, designers, and the like is required to be able to print an image by a home printer without changing the image size in a state where image information is written in the margin area of a margined formation target image. This is because the user of this print application will sometimes confirm the printed product by a home printer before requesting a printing press to print the margined formation target image data at an equal magnification. Pieces of image information such as the trim marks, the capturing date, and the like tend to be added when the printed product is to be confirmed. However, the print application may form a second margin portion further outside the margin portion of the input margined formation target image data and add the image information to this second margin portion. As a result, a margined formation target image which has a layout different from the layout intended by the user may be wrongly output. A procedure for adding image information while outputting a printed product which has the layout intended by the user will be described hereinafter. FIG. 6 is a flowchart showing an example of the procedure of the processing to add trim marks, and FIG. 7 is a flowchart showing the procedure of the processing to add capturing date. The processing to add the trim marks and the processing to add the capturing date are executed based on arbitrary operations performed by the user, and the order of each process can be selected arbitrarily as well.

In the processing of FIG. 6, the print application 101 determines whether an operation to add trim marks to the image of the margined formation target image data has been performed (whether the setting area 208 has been checked) (step S601). If it is determined that the operation to add the trim marks has been performed (YES in step S601), the print application 101 performs processing to add the trim marks to the four corners of the image (step S602). On the other hand, if it is determined that the processing to add the trim marks has not been performed (NO in step S601), the print application 101 will end the processing without adding the trim marks. Note that the area to which the trim marks are added in step S602 is the margin portion extracted in step S403 of FIG. 4. That is, the trim marks are superimposed and displayed on the margin portion included in the margined formation target image data. Subsequently, when the print button 210 is pressed in a state in which the trim marks are displayed on the image data, the trim marks will be printed together with the image. Note that each position where the trim mark is added is, for example, a position for cutting out an image portion from which the margin portion has been removed (for example, the position of 204 in FIG. 2).

In the processing of FIG. 7, the print application 101 determines whether an operation to add a character string indicating the capturing date on the image of the margined formation target image data has been performed (whether the setting area 209 has been checked) (step S701). If it is determined that the operation to add the capturing date has been performed (YES in step S701), the print application 101 will perform processing to add the character string indicating the capturing date onto the image displayed in the page display area 202 (step S702). Note that the information related to the capturing date is obtained from the margined formation target image data. On the other hand, if it is determined that the operation to add the capturing date has not been performed (NO in step S701), the print application 101 will end the processing without adding the character string indicating the capturing date. Note that an area where the character string indicating the capturing date is to be added is the margin portion extracted in step S403 of FIG. 4. That is, the character string indicating the capturing date is superimposed and displayed on the margin portion included in the margined formation target image data. In addition, the added character string indicating the capturing date can be moved to an arbitrary position in the margin portion area. For example, the user can change the arrangement position of the character string indicating the capturing date by dragging and dropping the character string. The print application 101 can determine whether an operation to move the addition position of the capturing date has been performed (step S703), and can change (step S704) the position of the character string indicating the capturing date in accordance with the operation if it is determined that such an operation has been performed (YES in step S703). On the other hand, if it is determined that the operation to move the addition position of the capturing date has not been performed (NO in step S703), the print application 101 will end the processing without executing the process of step S704. Note that the addition position of the capturing date can be restricted to a range within the margin portion. If the print button 210 is pressed in a state in which the capturing date is displayed, the capturing date is printed together with the image.

According to these processing operations, pieces of image information such as the trim marks and the capturing date can be added to the margin portion while maintaining the layout of the margin portion of the margined formation target image data as the input image data. As a result, it is possible to prevent the layout of the printing result from differing from the original margined formation target image. In addition, for example, since the printing result will be cut at the outer edge of the margin and be output, pieces of additional information can be appropriately added on a printed product that corresponds to the final product.

Note that the above-described processing example described processing performed in a case in which only one image is laid out on the input image data. However, a plurality of images may be laid out on the input image data in some cases. In such a case, if the plurality of images are arranged so as to be spaced apart from each other, the inclusion of blanks between the images will allow the input image data to be handled as a margined formation target image. Note that if the plurality of images are arranged so as to be in contact with each other and no margin is set for the entire area, the plurality of images can be included in a marginless formation target image. This marginless formation target image can be handled in a similar manner to the above-described processing. On the other hand, in the margined formation target image including the plurality of images, the margin portion of each included image can be specified and additional information can be added to this specified margin portion. Hence, an example of the procedure of processing of a case in which a margined formation target image that includes a plurality of images which have been laid out is handled as the input image will be described hereinafter.

Figure 8:
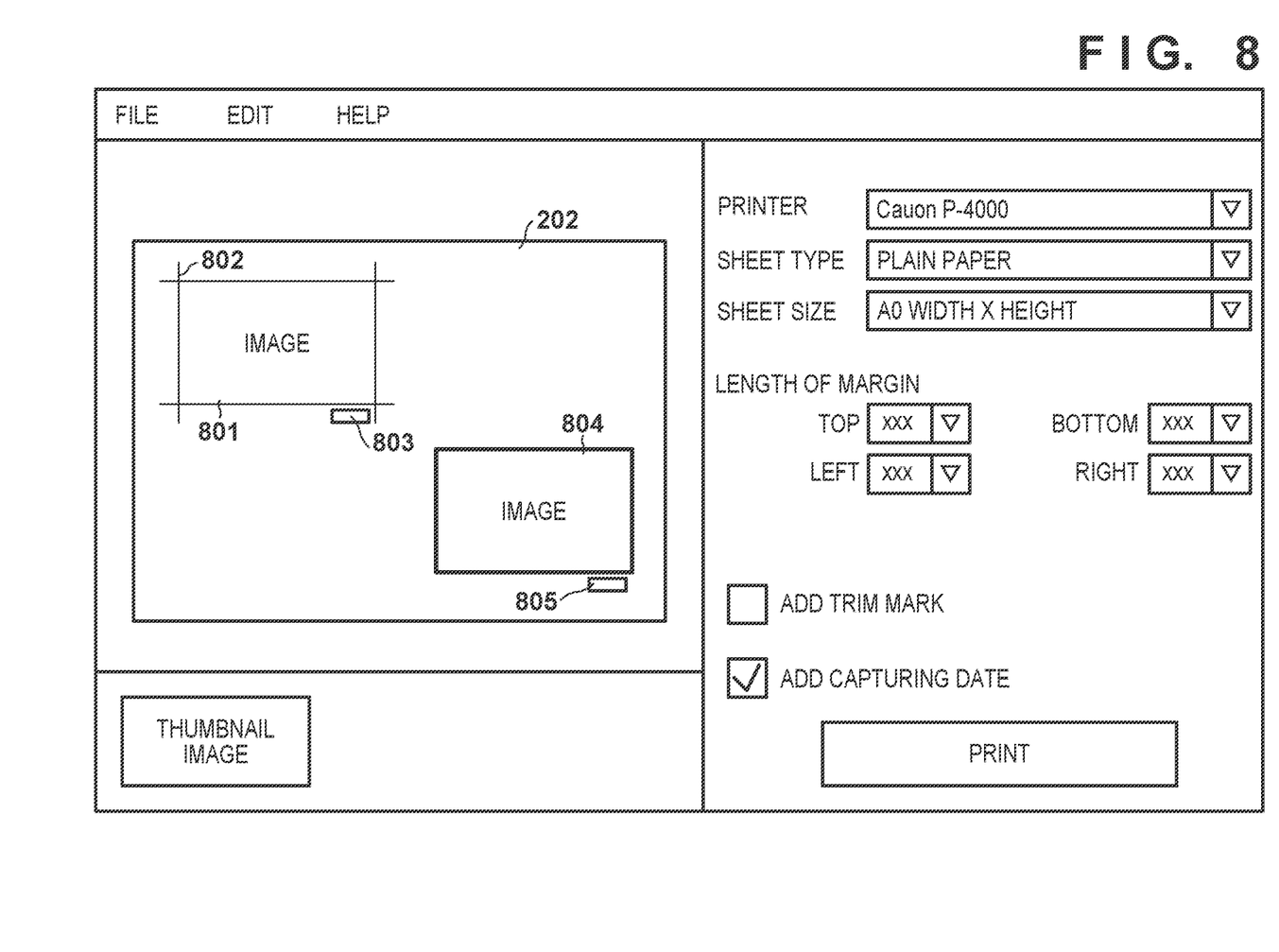
FIG. 8 is a view showing an example of the arrangement of the screen for accepting a user operation.

FIG. 8 is an example of the arrangement of a screen when a margined formation target image data in which a plurality of images have been laid out is set as the input image data in the print application 101. In FIG. 8, an operation to add pieces of image information such as the trim marks and the capturing date to the margin portion of each image can be accepted. Note that although two images are laid out in the example shown in FIG. 8, three or more images may be laid out. The input margined formation target image data is displayed in the page display area 202 in a similar manner to the processing example described above. FIG. 8 shows a state in which trim marks 802 and a capturing date 803 have been added to an image 801 due to the acceptance of the trim mark addition setting via the setting area 208 and the acceptance of the capturing date addition setting via the setting area 209. In addition, a state in which only a capturing date 805 has been added to an image 804 due to the acceptance of the capturing addition date setting via the setting area 209 is shown. In this processing example, the page display area 202 is configured to be able to accept, as an editing operation, the selection of an operation target image. If no image has been selected, a setting operation to add the pieces of image information at once to all of the images included in the page display area 202 can be performed via the setting area 208 and the setting area 209. On the other hand, if an image has been selected, a setting operation to individually add the pieces of image information to the selected image can be performed via the setting area 208 and the setting area 209. Note that two or more images of a plurality (for example, three or more) images can be selected together by setting an arrangement that accepts selection of images by clicking while a predetermined key such as a shift key or the like is pressed on a keyboard (not shown). In this case, it can be arranged so that the pieces of image information can be added at once to the selected two or more images.

Figure 9:
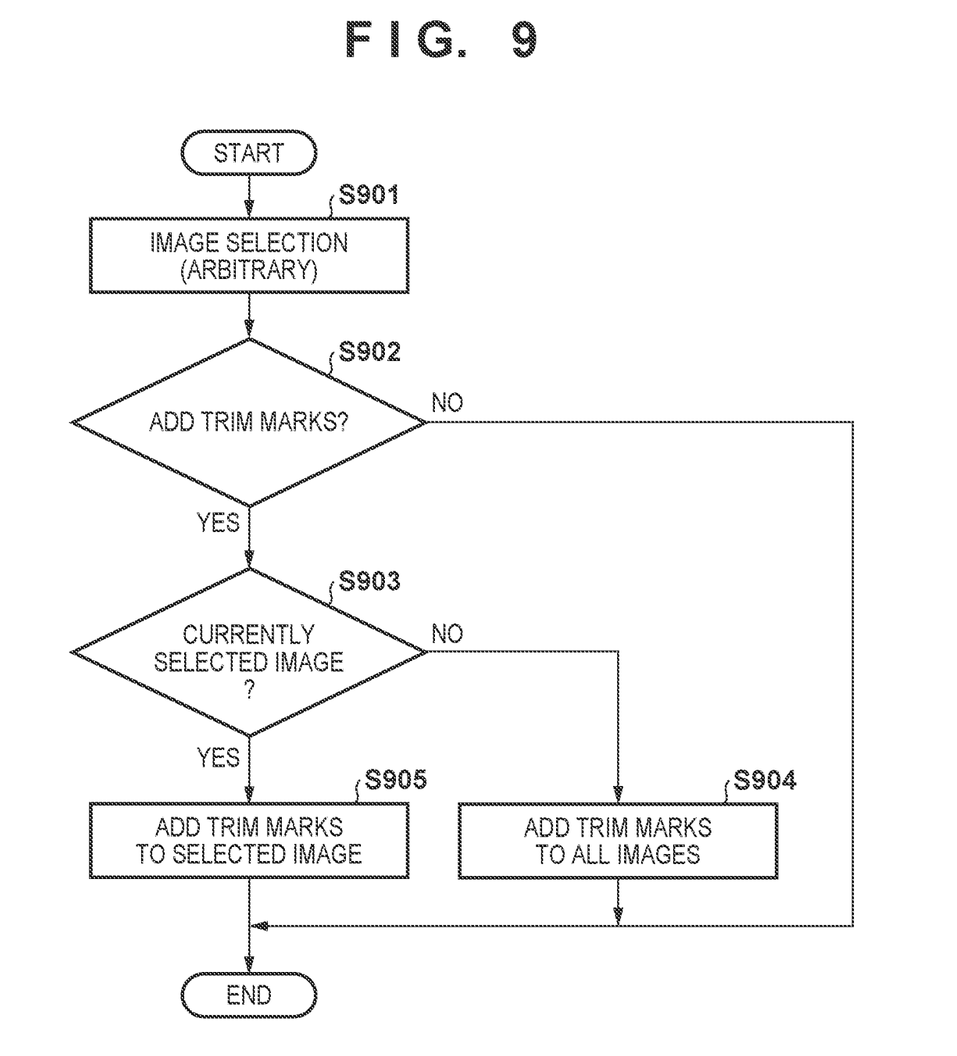
FIG. 9 is a flowchart showing a second example of the procedure of the processing to add the trim marks on the margined formation target image.

FIG. 9 is a flowchart showing an example of the procedure of processing to add trim marks to a margined formation target image in which a plurality of images have been laid out when such a margined formation target image has been input. In this processing, the print application 101 accepts arbitrary image selection made by the user (step S901). The print application 101 also accepts, via the setting area 208, user selection as to whether trim marks are to be added to an image (step S902). If the setting to add trim marks to an image has not been accepted (NO in step S902), the print application 101 will end the processing of FIG. 9. On the other hand, if the setting to add trim marks to an image has been accepted (YES in step S902), the print application 101 will determine if an image has been selected (step S903). If it is determined that no image has been selected (NO in step S903), the print application 101 will add trim marks to all of the images that have been laid out in the input image data (step S904). On the other hand, if it is determined that an image has been selected (YES in step S903), the print application 101 will add trim marks to each selected image (step S905). Note that although the trim marks are added within a predetermined range of the periphery of each image in this case, it can be arranged so the trim marks will not be added to at least an area outside the margin of the input margined formation target image data. According to this processing, the trim marks can be added while maintaining the layout of the margined formation target image data as the input image. As a result, the image information can be printed while preventing the layout of the printing result from differing from the layout of the original margined formation target image.

Figure 10:
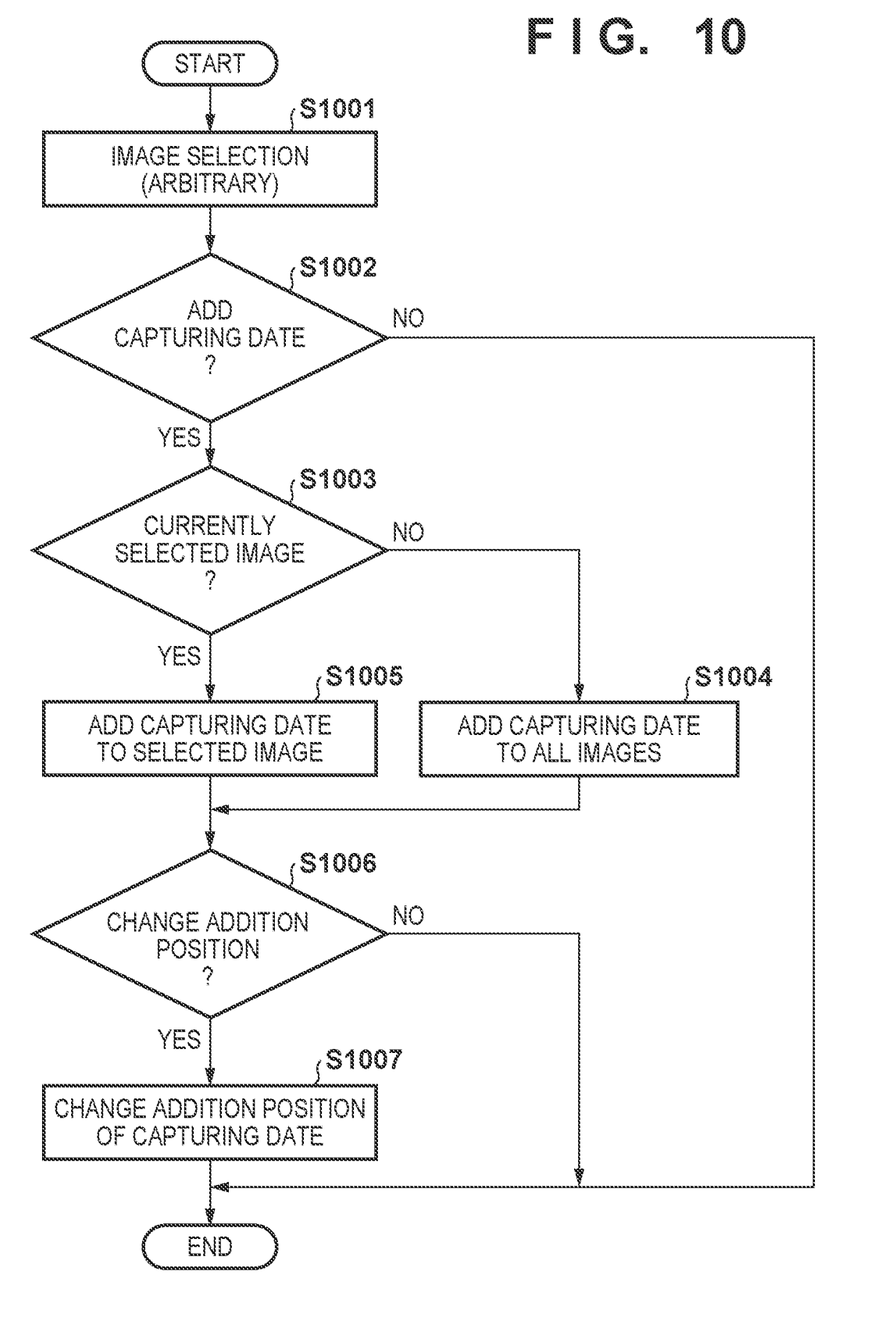
FIG. 10 is a flowchart showing a second example of the procedure of the processing to add the capturing date on the margined formation target image.

FIG. 10 is a flowchart showing an example of the procedure of processing to add a character string indicating a capturing date to a margined formation target image in which a plurality of images have been laid out when such a margined formation target image has been input. In this processing, the print application 101 accepts arbitrary image selection made by the user (step S1001). The print application 101 also accepts, via the setting area 209, user selection as to whether a character string indicating a capturing date is to be added to an image (step S1002). If the setting to add a character string indicating a capturing date to an image has not been accepted (NO in step S1002), the print application 101 will end the processing of FIG. 10. On the other hand, if the setting to add a character string indicating a capturing date to an image has been accepted (YES in step S1002), the print application 101 will determine if an image has been selected (step S1003). If it is determined that no image has been selected (NO in step S1003), the print application 101 will add, at once, the character string indicating the capturing date to all of the images that have been laid out in the input image data (step S1004). On the other hand, if it is determined that an image has been selected (YES in step S1003), the print application 101 will add a character string indicating an individual capturing date to each selected image (step S1005). Subsequently, the print application 101 determines whether an operation to change the position of the character string indicating the capturing date has been performed (step S1006). If an operation to change the position has been performed (YES in step S1006), the print application 101 will change the position of the character string indicating the capturing date to reflect this operation (step S1007), and end the processing. On the other hand, if an operation to change the position has not been performed (NO in step S1006), the print application 101 will directly end the processing. Note that although the character string indicating the capturing date is added to the periphery of each selected image in this case, it can be arranged so the character string will not be added to at least an area outside the margin of the input margined formation target image data. According to this processing, the character string indicating the capturing date can be added while maintaining the layout of the margined formation target image data as the input image data. As a result, the image information can be printed while preventing the layout of the printing result from differing from the layout of the original margined formation target image data. In addition, the additional information can be arranged flexibly since the position of the additional information can be changed for each image.

Note that the trim marks and the capturing date described above are merely examples of pieces of information to be added to an image, and other pieces of information may be added. For example, various kinds of information such as the capturing time, the name of the file indicating the formation target image data, the date and time of the creation of an image when the image is a formation target image data other than a photograph, a serial number, and the like may be used as the additional information. At this time, processing similar to the above-described processing related to the addition of trim marks can be performed for each piece of information which is not permitted to move like the trim marks, and processing similar to the above-described processing related to the addition of the capturing date can be performed for each piece of information which is permitted to move. Note that the state in which the trim marks cannot be moved in the above-described embodiment is merely an example, and processing similar to the processing related to the addition of the capturing date can be performed in a case in which the trim marks are permitted to move within the range of the margin portion. Also, for example, in a case in which the trim marks can be moved, the trim marks may be moved outside the margin portion. Furthermore, for example, it may be arranged so that a setting to determine whether trim marks are to be added to the inner side or the outer side of the margin portion can be accepted in the screen of FIG. 2. As one example, a window for designating whether to add the trim marks to the inner side or the outer side of the margin portion can be displayed when the addition of the trim marks is instructed via the setting area 208.

In addition, although the above-described processing determined whether to automatically perform the print setting based on whether the input image data is the margined formation target image data, the present invention is not limited to this. For example, it may be arranged so that a screen as shown in FIG. 2 in which the values of the lengths of all of the top, bottom, left, and right margins are set to zero will be displayed without displaying the screen of FIG. 3, in a case in which the marginless formation target image data has been input. Subsequently, when the user has set the length of each margin to a value greater than zero, the marginless formation target image will be set in the image portion and margins will be added to the periphery of this marginless formation target image set in the image portion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-210623, filed Nov. 21, 2019, which is hereby incorporated by reference herein in its entirety.

What is claimed is:

1. An image processing apparatus comprising:
one or more processors; and
one or more memories that store computer-readable instructions for causing, when executed by the one or more processors, the one or more processors to function as a plurality of units comprising:
(1) an input unit configured to input a margined formation target image that includes a margin;
(2) a specification unit configured to specify a margin portion from an input image that is the margined formation target image;
(3) an execution unit configured to automatically set, based on the specified margin portion, a margin size as a print setting of the input image;
(4) a display unit configured to display the margin size that is set by the execution unit; and
(5) a receiving unit configured to receive a designation to determine whether a trim mark is to be added to one of an inner side and an outer side of the margin,
wherein the execution unit further executes a setting to perform printing of the trim mark on the margin portion in a case in which the addition of the trim mark to the inner side of the margin portion is designated, and further executes a setting to perform printing without the trim mark on the margin portion in a case in which the addition of the trim mark to the outer side of the margin portion is designated.

2. The apparatus according to claim 1, wherein in a case in which the input image is a marginless formation target image formed so as not to include a margin, the execution unit accepts the print setting made on the input image by a user.

3. The apparatus according to claim 1, wherein the execution unit further executes a setting to perform printing by superimposing additional information onto the margin portion of the margined formation target image.

4. The apparatus according to claim 3, wherein the execution unit executes, in response to accepting a user operation to add the additional information, the setting to perform printing by superimposing the additional information on the margin portion.

5. The apparatus according to claim 3, wherein the additional information includes at least one of the trim mark and a character string which indicates a capturing date at which the input image was captured.

6. The apparatus according to claim 3, wherein the execution unit accepts a user operation to move the additional information within a range of the margin portion.

7. The apparatus according to claim 3, wherein in a case in which the margined formation target image is formed by including a plurality of images, the execution unit executes the setting to perform printing by superimposing the additional information within a predetermined range of a periphery of each of the plurality of images.

8. The apparatus according to claim 7, wherein the execution unit accepts a user operation to perform one of individually setting the additional information to each of the plurality of images and setting the additional information at once to not less than two of the plurality of images.

9. A control method to be executed by an image processing apparatus, the method comprising:
inputting a margined formation target image that includes a margin;

specifying a margin portion from an input image that is the margined formation target image;

receiving a designation to determine whether a trim mark is to be added to one of an inner side and an outer side of the margin;

automatically setting, based on the specified margin portion, a margin size as a print setting of the input image;

executing a setting to perform printing of the trim mark on the margin portion in a case in which the addition of the trim mark to the inner side of the margin portion is designated;

executing a setting to perform printing without the trim mark on the margin portion in a case in which the addition of the trim mark to the outer side of the margin portion is designated; and displaying the margin size that is set in the setting.

10. The method according to claim 9, wherein a setting to perform printing by superimposing additional information onto the margin portion of the margined formation target image is executed.

11. The method according to claim 10, wherein the setting to perform printing by superimposing the additional information onto the margin portion is executed in response to accepting a user operation to add the additional information.

12. The method according to claim 10, wherein the additional information includes at least one of the trim mark and a character string which indicates a capturing date at which the input image was captured.

13. The method according to claim 10, wherein in case in which the margined formation target image is formed by including a plurality of images, the setting to perform printing by superimposing the additional information is executed within a predetermined range of a periphery of each of the plurality of images.

14. A non-transitory computer-readable storage medium that stores a program for causing a computer included in an image processing apparatus to perform a method, the method comprising:

inputting a margined formation target image that includes a margin, specifying a margin portion from an input image that is the margined formation target image;

receiving a designation to determine whether the trim mark is to be added to one of an inner side and an outer side of the margin;

automatically setting, based on the specified margin portion, a margin size as a print setting of the input image;

executing a setting to perform printing of a trim mark on the margin portion in a case in which the addition of the trim mark to the inner side of the margin portion is designated;

executing a setting to perform printing without the trim mark on the margin portion in a case in which the addition of the trim mark to the outer side of the margin portion is designated; and displaying the margin size that is set in the setting.

15. The medium according to claim 14, wherein a setting to perform printing by superimposing additional information onto the margin portion of the margined formation target image is executed.

16. The medium according to claim 15, wherein the setting to perform printing by superimposing the additional information onto the margin portion is executed in response to accepting a user operation to add the additional information.

17. The medium according to claim 15, wherein the additional information includes at least one of the trim mark and a character string which indicates a capturing date at which the input image was captured.

18. The medium according to claim 15, wherein in case in which the margined formation target image is formed by including a plurality of images, the setting to perform printing by superimposing the additional information is executed within a predetermined range of a periphery of each of the plurality of images.

* * * * *